UNITED STATES PATENT OFFICE.

PHILIP A. KOBER, OF HASTINGS-UPON-HUDSON, NEW YORK, AND JOHN THEODORE MARSHALL, OF PHILADELPHIA, PENNSYLVANIA.

MANUFACTURE OF SALTS OF PHENOLPHTHALIC ACID AND ITS DERIVATIVES.

1,071,321.   Specification of Letters Patent.   Patented Aug. 26, 1913.

No Drawing.   Application filed December 29, 1910. Serial No. 599,812.

*To all whom it may concern:*

Be it known that we, PHILIP A. KOBER, a citizen of the United States, residing at Hastings-upon-Hudson, county of Westchester, State of New York, and JOHN THEODORE MARSHALL, a citizen of the United States, residing at Philadelphia, county of Philadelphia, State of Pennsylvania, have invented certain new and useful Improvements in Manufacture of Salts of Phenolphthalic Acid and Its Derivatives; and we do hereby declare the following to be a full, clear, and exact description of the invention, such as will enable others skilled in the art to which it appertains to make and use the same.

Our invention relates to the production of isolated salts of phenolphthalic acid and its derivatives, these isolated salts finding useful employment as therapeutic agents and being particularly adapted for use as laxatives by administration either in the usual way or by subcutaneous injection.

In so far as we are aware, salts of phenolphthalic acid and its derivatives have not heretofore been isolated, and it will therefore be understood that our invention and the claims forming a part of this specification and based upon the following disclosure are intended to have a correspondingly fundamental or generic scope. In carrying out the invention, the methods that we have found feasible for obtaining the isolation of the salts we prefer to direct, in the first instance, to the production of the tri-basic salts of the acid or its derivatives, and to thereafter produce the mono-basic salt from the tri-basic salt thus obtained. For the production of the tri-basic salt, we may proceed from phenolphthalein or from a suitable derivative of phenolphthalein such as the chlor or brom derivative.

As a typical illustration of the method of producing the tri-basic salt from phenolphthalein we may give the following example: 30 grams of phenolphthalein may be moistened with water to form a paste, and is then treated with a saturated aqueous solution containing 150 grams of potassium hydrate. The mixture is then warmed at a temperature of say 80° C. and preferably at a reduced pressure, say a pressure corresponding to 30 millimeters of mercury, for the purpose of concentrating the solution by driving off such percentage of its moisture as will permit the desired crystallization. The solution is then cooled to about zero C. and is allowed to stand for say twelve hours out of contact with the air and moisture, so as to avoid the formation of carbonates by reason of any carbon di-oxid present in the air and to prevent decomposition of the crystals already formed. The precipitate is then filtered off, as, for instance, through asbestos fiber, or centrifugally, and is then washed, first with a small volume of ice cold water and then with a mixture of equal volumes of ethyl alcohol and benzene, preferably at a temperature below 10° C. The washing is then further continued, preferably with a mixture of 30% of ethyl alcohol in benzol, and finally with ethyl ether. The washed precipitate, consisting of the tri-basic salt of phenolphthalic acid, is then dried in vacuo. It will, of course, be understood that the purpose of washing the precipitate is to get rid of the mother liquor in which the crystals are formed and to obtain the dry product with as little subsequent decomposition or alteration as is possible. Any other suitable or lixiviating operation adapted to the purpose may be employed within the knowledge of those skilled in the art.

The tri-basic salt produced by the treatment of the phenolphthalein, as above described, with the potassium hydrate will be the tri-basic potassium salt, obtained in accordance with the following formula to wit:

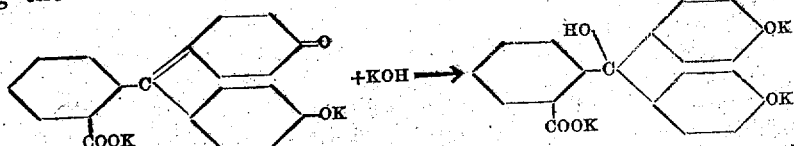

As will be noted, from the example given, the potassium hydrate is employed in excess, which is preferable for the production of the best results.

For the production of the corresponding sodium salt, we may conveniently proceed as follows: 80 grams of phenolphthalein, moistened with water to form a paste is treated with the saturated aqueous solution containing 80 grams of sodium hydrate. The mixture is then warmed and concentrated under the same conditions as to temperature and reduced pressure hereinbefore specified until crystallization in the mother liquor takes place. In this instance, it is not necessary to permit the solution to stand for any given period of time but it may be at once cooled and filtered, as before. It may then be washed with say 20% of alcohol in benzol until the crystals, which have a tendency to stick together, form a loose mass. The washing is then completed with pure benzol or some other like substance not miscible in water and containing none of the hydroxyl group.

In like manner other of the alkaline tribasic salts may be obtained by treating phenolphthalein with saturated aqueous solutions of other hydrates, as lithium hydrate, calcium hydrate, and the like; but the employment of these other hydrates is less desirable from the fact that they are but slightly soluble in water and therefore require a greater amount of concentration for the crystallizing out of the salt produced. Thus by treating phenolphthalein with calcium hydrate in excess, we have

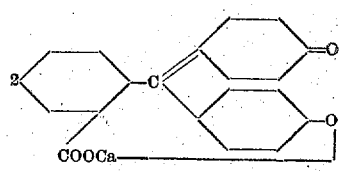 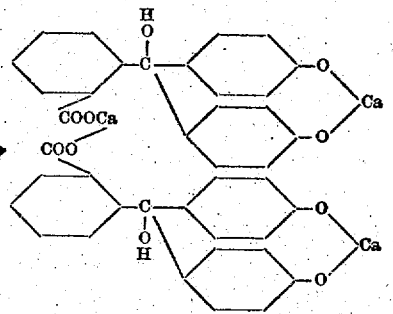

The tribasic calcium phenolphthalate thus produced when treated with carbonic acid ($H_2CO_3$) or a fatty acid, will give the monobasic calcium phenolphthalate, according to the following formula:

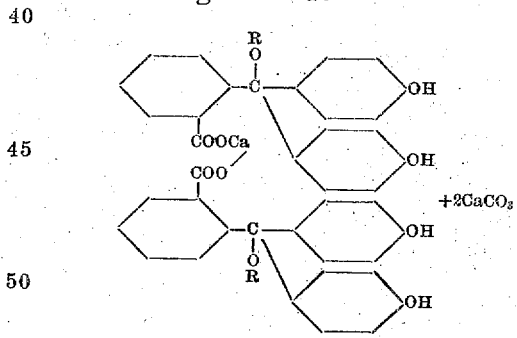

As hereinbefore indicated, instead of employing phenolphthalein itself as the starting point of the operation we may proceed from one of its derivatives, for which purpose we usually prefer to employ either the chlor derivative or the brom derivative, on account of the high therapeutic value of the salts produced therefrom. For instance, the chlor derivative known as phenoltetrachlorphthalein may be treated to produce any of the alkaline tri-basic salts by substituting it, in the operations hereinbefore described, for phenolphthalein itself; and, in general, the same is true of other phenolphthalein derivatives, as, for instance, the esters and others.

From the tri-basic salts, produced in accordance with the procedures hereinbefore specified, we may likewise produce the monobasic salts of phenolphthalic acid and its derivatives. This may be conveniently accomplished by treating the tri-basic salt in the presence of cold absolute alcohol or in the presence of acetone, with a weak acid for the purpose of decomposing the tri-basic salt and producing the mono-basic salt which is soluble in the alcohol or acetone. Where absolute alcohol is employed for this purpose it will be convenient to employ as the weak acid an alcoholic or ethereal solution of fatty acids (for example, stearic acid, or oleic acid) whose soaps are insoluble in alcohol, and then precipitating out the monobasic salt with ethyl ether, benzin, ligroin, or other suitable ethereal solvents; whereupon the mono-basic salt is filtered and dried as before. Where carbonic acid is employed as the weak acid, the resulting carbonates are insoluble in the acetone or in the alcohol employed and are precipitated out together with such portion of the tri-basic salt as may remain undecomposed. After filtering off the insoluble matter, a sufficient amount of ethyl ether or some other suitable precipitating liquid is added to the mono-basic salt solution until the mono-basic salt is precipitated out, whereupon it is filtered and washed. Where, for instance, the monobasic salt is produced from the tri-basic salt of a phenolphthalic acid derivative, the operation may be expressed by means of the following general formula, to wit:

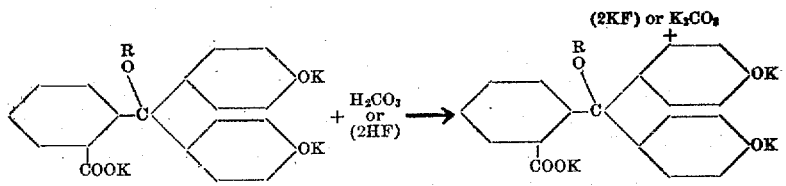

wherein R represents hydrogen or any substitute for hydrogen as, for instance $C_2H_5$, $C_6H_5$, etc., and wherein HF represents any of the fatty acids.

It will be understood, therefore, that the production of the mono-basic salt from the tri-basic salt may be practised, in accordance with our invention, an any reaction represented by this general formula.

Our phthalate product, whether in the tri-basic form or in the mono-basic form, has as its ultimate basis phenolphthalein, either as such, or in some of its derivatives, as hereinbefore described. In this sense, it is both generically and specifically new, in so far as we are aware.

What we claim is:

1. The method of obtaining phthalates from phenolphthalein and its derivatives, which consists in subjecting the same to the action of an alkali until a phthalate is produced, and separating it out in solid form; substantially as described.

2. The method of obtaining phthalates from phenolphthalein and its derivatives, which consists in subjecting the same to the action of an aqueous solution of alkali until a phthalate is produced, and crystallizing out the resulting phthalate; substantially as described.

3. The method of obtaining phthalates from phenolphthalein and its derivatives, which consists in subjecting the same to the action of an aqueous solution of alkali until a phthalate is produced, and crystallizing out the resulting phthalate by evaporation in vacuo; substantially as described.

4. The method of obtaining phthalates from phenolphthalein and its derivatives, which consists in subjecting the same to the action of an aqueous solution of alkali until a phthalate is produced, crystallizing out the resulting phthalate, washing the crystals to remove free alkali, and drying them; substantially as described.

5. The method of obtaining phthalates from phenolphthalein and its derivatives, which consists in subjecting the same to the action of an alkali until a phthalate is produced, separating it out in solid form, and finally converting it into the mono-basic salt; substantially as described.

6. The method of obtaining phthalates from phenolphthalein and its derivatives, which consists in subjecting the same to the action of an alkali until a phthalate is produced, separating it out in solid form, and finally converting it into the mono-basic salt by dissolving it in a non-aqueous solvent in which alkaline carbonates and alkaline salts of weak acid are insoluble, subjecting it to the action of a weak acid, and precipitating by means of an ethereal solvent; substantially as described.

7. An isolated monobasic phenolphthalate; substantially as described.

8. An isolated monobasic alkaline phenolphthalate; substantially as described.

In testimony whereof we affix our signatures in presence of two witnesses.

PHILIP A. KOBER.
JOHN THEODORE MARSHALL.

Witnesses:
CLAYTON McELROY,
LIZZIE MOGEN.

---

It is hereby certified that in Letters Patent No. 1,071,321, granted August 26, 1913, upon the application of Philip A. Kober, of Hastings-upon-Hudson, New York. and John Theodore Marshall, of Philadelphia, Pennsylvania, for an improvement in "The Manufacture of Salts of Phenolphthalic Acid and its Derivatives," errors appear in the printed specification requiring correction as follows: Page 1, line 73, for the word "benzol" read *benzene;* page 3, line 8, for the article "an" read *in;* and same page, formula, symbols appearing at the end of the lines, for "OK" read *OH* in both places; and that the said Letters Patent should be read with these corrections therein that the same may conform to the record of the case in the Patent Office.

Signed and sealed this 30th day of September, A. D., 1913.

[SEAL.]

R. T. FRAZIER,
*Acting Commissioner of Patents.*

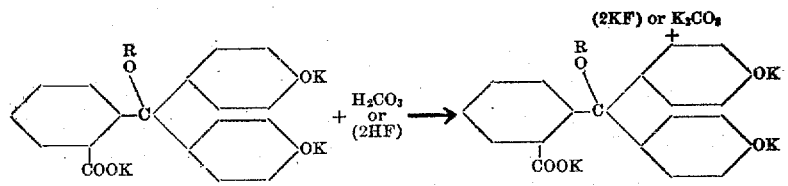

wherein R represents hydrogen or any substitute for hydrogen as, for instance $C_2H_5$, $C_6H_5$, etc., and wherein HF represents any of the fatty acids.

It will be understood, therefore, that the production of the mono-basic salt from the tri-basic salt may be practised, in accordance with our invention, an any reaction represented by this general formula.

Our phthalate product, whether in the tri-basic form or in the mono-basic form, has as its ultimate basis phenolphthalein, either as such, or in some of its derivatives, as hereinbefore described. In this sense, it is both generically and specifically new, in so far as we are aware.

What we claim is:

1. The method of obtaining phthalates from phenolphthalein and its derivatives, which consists in subjecting the same to the action of an alkali until a phthalate is produced, and separating it out in solid form; substantially as described.

2. The method of obtaining phthalates from phenolphthalein and its derivatives, which consists in subjecting the same to the action of an aqueous solution of alkali until a phthalate is produced, and crystallizing out the resulting phthalate; substantially as described.

3. The method of obtaining phthalates from phenolphthalein and its derivatives, which consists in subjecting the same to the action of an aqueous solution of alkali until a phthalate is produced, and crystallizing out the resulting phthalate by evaporation in vacuo; substantially as described.

4. The method of obtaining phthalates from phenolphthalein and its derivatives, which consists in subjecting the same to the action of an aqueous solution of alkali until a phthalate is produced, crystallizing out the resulting phthalate, washing the crystals to remove free alkali, and drying them; substantially as described.

5. The method of obtaining phthalates from phenolphthalein and its derivatives, which consists a subjecting the same to the action of an alkali until a phthalate is produced, separating it out in solid form, and finally converting it into the mono-basic salt; substantially as described.

6. The method of obtaining phthalates from phenolphthalein and its derivatives, which consists in subjecting the same to the action of an alkali until a phthalate is produced, separating it out in solid form, and finally converting it into the mono-basic salt by dissolving it in a non-aqueous solvent in which alkaline carbonates and alkaline salts of weak acid are insoluble, subjecting it to the action of a weak acid, and precipitating by means of an ethereal solvent; substantially as described.

7. An isolated monobasic phenolphthalate; substantially as described.

8. An isolated monobasic alkaline phenolphthalate; substantially as described.

In testimony whereof we affix our signatures in presence of two witnesses.

PHILIP A. KOBER.
JOHN THEODORE MARSHALL.

Witnesses:
CLAYTON McELROY,
LIZZIE MOGEN.

---

It is hereby certified that in Letters Patent No. 1,071,321, granted August 26, 1913, upon the application of Philip A. Kober, of Hastings-upon-Hudson, New York, and John Theodore Marshall, of Philadelphia, Pennsylvania, for an improvement in "The Manufacture of Salts of Phenolphthalic Acid and its Derivatives," errors appear in the printed specification requiring correction as follows: Page 1, line 73, for the word "benzol" read *benzene;* page 3, line 8, for the article "an" read *in;* and same page, formula, symbols appearing at the end of the lines, for "OK" read *OH* in both places; and that the said Letters Patent should be read with these corrections therein that the same may conform to the record of the case in the Patent Office.

Signed and sealed this 30th day of September, A. D., 1913.

[SEAL.]

R. T. FRAZIER,
*Acting Commissioner of Patents.*

It is hereby certified that in Letters Patent No. 1,071,321, granted August 26, 1913, upon the application of Philip A. Kober, of Hastings-upon-Hudson, New York, and John Theodore Marshall, of Philadelphia, Pennsylvania, for an improvement in "The Manufacture of Salts of Phenolphthalic Acid and its Derivatives," errors appear in the printed specification requiring correction as follows: Page 1, line 73, for the word "benzol" read *benzene;* page 3, line 8, for the article "an" read *in;* and same page, formula, symbols appearing at the end of the lines, for "OK" read *OH* in both places; and that the said Letters Patent should be read with these corrections therein that the same may conform to the record of the case in the Patent Office.

Signed and sealed this 30th day of September, A. D., 1913.

[SEAL.]
R. T. FRAZIER,
*Acting Commissioner of Patents.*